Sept. 26, 1933.   C. H. TAYLOR   1,928,078
BRAKE
Filed April 26, 1928
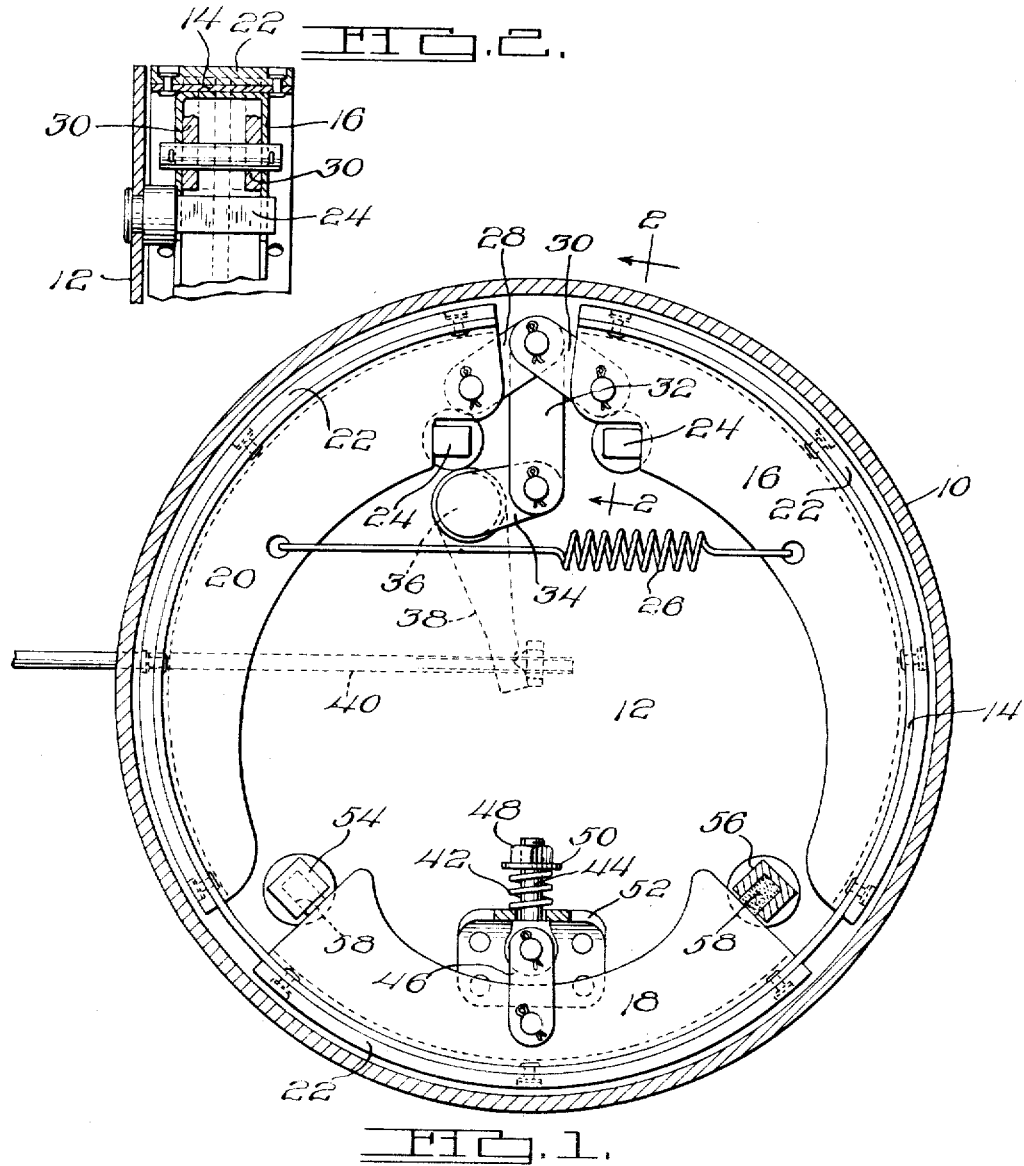
INVENTOR
Cecil H. Taylor
BY
M. W. McConkey
ATTORNEY Patented Sept. 26, 1933

1,928,078

UNITED STATES PATENT OFFICE 1,928,078

BRAKE

Cecil H. Taylor, South Bend, Ind., assignor to Bendix Brake Company, South Bend, Ind., a corporation of Illinois Application April 26, 1928. Serial No. 272,946

8 Claims. (Cl. 188—78)

This invention relates to brakes and is illustrated as embodied in an internal expanding automobile brake of the "three-shoe" type. An object of the invention is to arrange the parts of the brake to secure an effective "servo" action in both directions of rotation of the brake drum and also to simplify the manufacture of the shoe assembly and to improve the operating means and the means for returning the brake to released position. Various features of novelty relate to use for a friction means of a continuous band reinforced to form a plurality of substantially rigid segments which are flexibly connected by the band itself, to a novel set of anchorages engaging opposite ends of one of the segments, to an improved applying device in the form of a toggle or the like which shifts the central portion of the friction means against the rotating brake drum prior to the complete application of the brake, and to a novel construction of the reinforcing means for the band. These and other features and objects of the invention will be apparent from the following description of one illustrative embodiment shown in the accompanying drawing, in which:

Figure 1 is a vertical section through the brake just inside the head of the brake drum and showing the friction means of the brake in side elevation; and Figure 2 is a section through one of the segments or shoes of the friction means substantially on the line 2—2 of Figure 1.

The brake selected for illustration includes the usual rotatable brake drum 10 at the open side of which there is arranged a suitable support such as a stationary backing plate 12, and within which is arranged the friction means of the brake. According to one feature of the present invention, the friction means may include a continuous band 14 reinforced by three U-section steel stampings 16, 18 and 20 to form in effect three flexibly connected shoes or segments. The band is shown as provided with suitable brake lining 22 preferably attached in segments corresponding to the three segments 16, 18 and 20.

The shoes 16 and 20 are shown notched out to fit over squared stops 24 when the brake is released, a spring 26 being tensioned between the shoes to hold them against these stops. The stops 24 may have integral portions riveted over to secure them permanently to the backing plate as shown in Figure 2. The brake is applied in a novel manner against the resistance of the spring 26 by means such as a toggle formed of links 28 and 30 operated by a floating link 32 connected to the knuckle of the toggle and to an arm 34 fixed on a shaft 36 operated by a lever 38 outside of the backing plate. The lever 38 is connected by a suitable pull rod or cable 40 to the usual operating mechanism on the chassis of the car.

The shoe 18 is shown urged inwardly away from the brake drum toward released position by a coil spring 42 sleeved on a plunger 44 pivotally connected by a link 46 to the shoe 18. The spring 42 is compressed between an adjustable stop formed by a nut 48 threaded on the end of the plunger 44 and holding a washer 50, at its upper end, and a fixed stamping 52 riveted to the backing plate and formed with an opening through which the plunger 44 extends.

The brake is arranged in the illustrated construction to anchor at one end or the other of the shoe 18 according to the direction of rotation of the brake drum and to this end is provided with two fixed anchor members 54 and 56 fixedly mounted on the backing plate 12, and arranged at opposite ends of the shoe 18. The anchors 54 and 56 are preferably provided with cushions 58 of cork or fiber material such as rubber or, if desired, of phenolic condensation material such as bakelite. The blocks 58 prevent undue shock or noise as the brake anchors when it is applied.

It will be noted that the toggle formed by the sets of links 28 and 30 opens toward the center of the brake drum so that when the brake is applied by turning the shaft 36 in a clockwise direction by tension on the member 40 the entire shoe assembly is urged downwardly to force the central segment of the band against the rotating brake drum prior to the complete application of the brake. This action takes place against the resistance of the spring 42 while the spring 26 is still holding the shoes 16 and 20 against the stops 24. As soon as the shoe 18 engages the drum, the friction of the drum forces it against one or the other of the anchors 54 or 56 and holds it there during the remainder of the application of the brake. Continued tension on the member 40 then forces the shoes 16 and 20 apart against the resistance of the spring 26 to complete the application of the brake.

While one illustrative embodiment of my invention has been described in detail, it is not my intention to limit its scope to that particular embodiment or otherwise than by the terms of the appended claims.

I claim:

1. A brake comprising, in combination, a rotatable drum, floating friction means including a plurality of segments arranged end to end within the drum, anchorages at opposite ends of one of the segments, an applying means acting in two stages, first to force against the drum the segment between the two anchorages and then to complete the application of the brake.

2. A brake comprising, in combination, a friction device and an anchorage for the friction device formed with a block of cushion material for engagement with the friction device.

3. A brake anchor formed for engagement with the friction means of a brake and formed with a recess containing a block of cushion material arranged to form the part engaging the friction means.

4. A brake comprising, in combination, a friction retarding means and anchoring means therefor, together with a block of yieldable material intermediate the anchor and the friction retarding means.

5. A brake comprising, in combination, a friction retarding element, a pair of spaced rigid anchors therefor and resilient means interposed between each of said anchors and said retarding element.

6. A brake including a backing plate, a retarding means thereon, an anchoring element on the backing plate for said means together with a rubber block interposed between said retarding means and anchor.

7. A brake including a movable shoe, an anchor therefor and a resilient block of cushioning material interposed between said shoe and anchor.

8. A brake anchor post having a block of cushioning material mounted thereon.

CECIL H. TAYLOR.

CERTIFICATE OF CORRECTION.

Patent No. 1,928,078.  September 26, 1933.

CECIL H. TAYLOR.

It is hereby certified that error appears in the printed specification of the above numbered patent requiring correction as follows: Page 2, line 16, claim 4, for "therefor, together with" read directly engaged by the retarding means and including; and line 17, for "anchor" read anchoring means; line 77, claim 5, after "element," insert the words a backing plate carrying the friction element and which has mounted thereon; and line 78, for "therefor" read for said element; lines 83 and 84, claim 6, for "for said means together with" read directly taking the torque of said means and having; line 88, claim 7, after "material" insert the word directly; and line 91, claim 8, after "thereon" insert the words at one end for direct engagement with a friction element and having its other end provided with means for rigidly mounting the post on a brake backing plate; and that the said Letters Patent should be read with these corrections therein that the same may conform to the record of the case in the Patent Office.

Signed and sealed this 16th day of January, A. D. 1934.

F. M. Hopkins
Acting Commissioner of Patents.

(Seal)

of one of the segments, an applying means acting in two stages, first to force against the drum the segment between the two anchorages and then to complete the application of the brake.

2. A brake comprising, in combination, a friction device and an anchorage for the friction device formed with a block of cushion material for engagement with the friction device.

3. A brake anchor formed for engagement with the friction means of a brake and formed with a recess containing a block of cushion material arranged to form the part engaging the friction means.

4. A brake comprising, in combination, a friction retarding means and anchoring means therefor, together with a block of yieldable material intermediate the anchor and the friction retarding means.

5. A brake comprising, in combination, a friction retarding element, a pair of spaced rigid anchors therefor and resilient means interposed between each of said anchors and said retarding element.

6. A brake including a backing plate, a retarding means thereon, an anchoring element on the backing plate for said means together with a rubber block interposed between said retarding means and anchor.

7. A brake including a movable shoe, an anchor therefor and a resilient block of cushioning material interposed between said shoe and anchor.

8. A brake anchor post having a block of cushioning material mounted thereon.

CECIL H. TAYLOR.

CERTIFICATE OF CORRECTION.

Patent No. 1,928,078.   September 26, 1933.

CECIL H. TAYLOR.

It is hereby certified that error appears in the printed specification of the above numbered patent requiring correction as follows: Page 2, line 16, claim 4, for "therefor, together with" read directly engaged by the retarding means and including; and line 17, for "anchor" read anchoring means; line 77, claim 5, after "element," insert the words a backing plate carrying the friction element and which has mounted thereon; and line 78, for "therefor" read for said element; lines 83 and 84, claim 6, for "for said means together with" read directly taking the torque of said means and having; line 88, claim 7, after "material" insert the word directly; and line 91, claim 8, after "thereon" insert the words at one end for direct engagement with a friction element and having its other end provided with means for rigidly mounting the post on a brake backing plate; and that the said Letters Patent should be read with these corrections therein that the same may conform to the record of the case in the Patent Office.

Signed and sealed this 16th day of January, A. D. 1934.

(Seal)
F. M. Hopkins
Acting Commissioner of Patents.

CERTIFICATE OF CORRECTION.

Patent No. 1,928,078.　　　　　　　　　　　　　　　　　September 26, 1933.

CECIL H. TAYLOR.

It is hereby certified that error appears in the printed specification of the above numbered patent requiring correction as follows: Page 2, line 16, claim 4, for "therefor, together with" read directly engaged by the retarding means and including; and line 17, for "anchor" read anchoring means; line 77, claim 5, after "element," insert the words a backing plate carrying the friction element and which has mounted thereon; and line 78, for "therefor" read for said element; lines 83 and 84, claim 6, for "for said means together with" read directly taking the torque of said means and having; line 88, claim 7, after "material" insert the word directly; and line 91, claim 8, after "thereon" insert the words at one end for direct engagement with a friction element and having its other end provided with means for rigidly mounting the post on a brake backing plate; and that the said Letters Patent should be read with these corrections therein that the same may conform to the record of the case in the Patent Office.

Signed and sealed this 16th day of January, A. D. 1934.

(Seal)　　　　　　　　　　　　　　　　　　　F. M. Hopkins
　　　　　　　　　　　　　　　　　　　　　Acting Commissioner of Patents.